(12) United States Patent
Lanfranchi

(10) Patent No.: US 8,297,431 B2
(45) Date of Patent: Oct. 30, 2012

(54) APPARATUS FOR UNSCRAMBLING AND ALIGNING BULK PLASTIC CONTAINERS

(75) Inventor: Lino Lanfranchi, Collecchio (IT)

(73) Assignee: Lanfranchi S.r.l., Collecchio (Parma) (IT)

( * ) Notice: Subject to any disclaimer, the term of this patent is extended or adjusted under 35 U.S.C. 154(b) by 395 days.

(21) Appl. No.: 12/481,116

(22) Filed: Jun. 9, 2009

(65) Prior Publication Data

US 2009/0301840 A1 Dec. 10, 2009

(30) Foreign Application Priority Data

Jun. 10, 2008 (IT) .............................. PR2008A0039

(51) Int. Cl.
*B65G 17/32* (2006.01)

(52) U.S. Cl. .............................. 198/397.02; 198/377.01

(58) Field of Classification Search ............... 198/376, 198/397.01, 397.02, 449, 450, 377.01–377.1, 198/474.1
See application file for complete search history.

(56) References Cited

U.S. PATENT DOCUMENTS

| | | | | |
|---|---|---|---|---|
| 1,821,883 A | * | 9/1931 | Enock ..................... | 198/474.1 |
| 2,415,997 A | * | 2/1947 | Eldred .................... | 198/343.2 |
| 3,319,764 A | * | 5/1967 | Gamberini ............. | 198/377.04 |
| 5,370,216 A | * | 12/1994 | Tsuruyama et al. ......... | 198/395 |
| 5,421,447 A | | 6/1995 | Ruth et al. | |
| 5,439,093 A | | 8/1995 | Drewitz | |
| 5,975,278 A | * | 11/1999 | Ruth ....................... | 198/377.01 |
| 6,904,665 B2 | * | 6/2005 | Walz ........................ | 29/563 |
| 6,938,753 B2 | * | 9/2005 | Bonatti et al. ............ | 198/470.1 |

FOREIGN PATENT DOCUMENTS

| | | |
|---|---|---|
| EP | 0 401 698 A2 | 12/1990 |
| EP | 1 864 942 A1 | 12/2007 |
| WO | WO 2006/076939 A1 | 7/2006 |

OTHER PUBLICATIONS

European Search Report, dated Sep. 18, 2009.

* cited by examiner

*Primary Examiner* — Gene Crawford
*Assistant Examiner* — William R Harp
(74) *Attorney, Agent, or Firm* — Young & Thompson

(57) ABSTRACT

An apparatus (1) for unscrambling and aligning bulk plastic containers (2) includes a plurality of pick-up element (3) for picking up containers (2), which are mounted to one or more pull-out turrets (50) of rotary type (4), located at each aperture (5a) the pick-up element (3) being of the type adapted to pull out the container (2) from the pocket (7) at the corresponding aperture (5a) and rotate it neck up; the pull-out action being substantially radial to the position of the container (2) in the ring (7a) of pockets (7). Each pick-up unit (3) has element (14, 40) for adjusting its rotation in a first axis (AA) and its height in one more axis (BB), to change both the pick-up position and the release location according to the type of container (2).

2 Claims, 4 Drawing Sheets

APPARATUS FOR UNSCRAMBLING AND ALIGNING BULK PLASTIC CONTAINERS

BACKGROUND OF THE INVENTION

Figure 2:
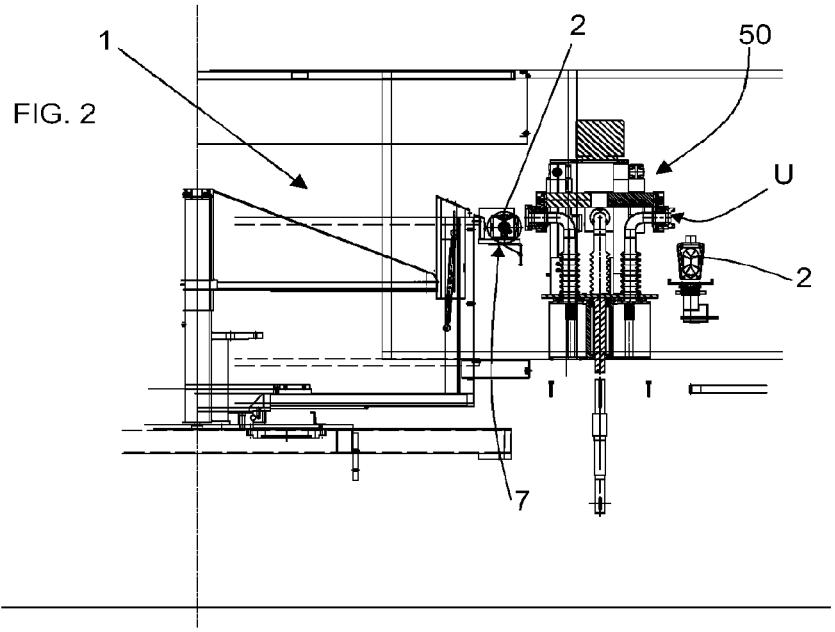

The present invention relates to an apparatus for unscrambling and aligning bulk plastic bottles, containers, cans or preforms.

DESCRIPTION OF THE RELATED ART

Such unscrambling process is carried out using a special apparatus which finds application in the bottling field, namely upstream from handling lines for plastic bottles/performs or generally for containers/bottles/cans, as it allows unscrambling and alignment thereof.

These are industrial apparatus, therefore they are supposed to provide higher and higher production rates, which means that they must produce a larger number of unscrambled containers with no interruption.

Various types of apparatus have been developed in the art to solve the above problem.

Typical apparatus utilize mechanical means, such as gravity cradles or hoppers, for erecting containers (conveniently laid into cradling pockets).

U.S. Pat. No. 5,439,093 discloses an apparatus in which the bottles (or containers) are loaded and carried by an elevator into a pre-orienting hopper, whose function is to arrange and unscramble the bottles in two possible configurations (with the neck in either upward or downward direction) so that they can be carried by a conveyor belt from said hopper to a container pick up and position inspection station.

After being picked up by one of said pick-up means, the container has its position checked by the inspection means and, as the pick-up carousel rotates, the container is suitably rotated to its optimal configuration when it reaches the belt conveyor for aligned and unscrambled bottles.

This invention differs from that disclosed in U.S. Pat. No. 5,439,093 in that containers are pulled out by suitable pick-up means in a direction that is substantially radial to the circular arrangement of containers, which are disposed over a ring of cradling pockets or trays, concentric with the loading hopper.

Patents that disclose a container pull-out process by suitable pick-up means in a substantially radial direction are U.S. Pat. Nos. 5,058,731 and 5,421,447: both include suction cups that contact and pull out containers and lay them onto a belt or equivalent conveyor.

SUMMARY OF THE INVENTION

The present invention differs from the prior art in various respects, most importantly its versatility, allowing it to handle any shape and size.

Furthermore, the apparatus of the present invention includes means for causing arbitrary rotation of the pick-up/handling unit for the items to be unscrambled, which rotation takes place according to how said container is read by appropriate vision means, which pre-orient the pick-up unit so that the hand is arranged and oriented in proper position for being pulled out and then laid again, preferably in a vertical position, onto a belt or equivalent means.

Finally, the use of a suitable high-flow fan allows the pick-up step to occur without contact with the container.

The object of the present invention is to provide an apparatus that can pick up the container as it is from its pocket and can place it at the required angle and at a desired subsequent location.

The advantages provided by this invention may be summarized as follows:

It can unscramble any type of bottle, regardless of its shape and position in the pocket.

Its rotation is variable and adjustable according to the actual position of the container/bottle to be picked up and erected.

It can reduce costs and times for format change, as it can pick up and position any format of bottles and/or containers and/or cans and/or preforms.

These objects and advantages are achieved by the apparatus and process for unscrambling and aligning bulk containers of the present invention, which is characterized as defined in the annexed claims.

BRIEF DESCRIPTION OF THE DRAWING FIGURES

Figure 1:
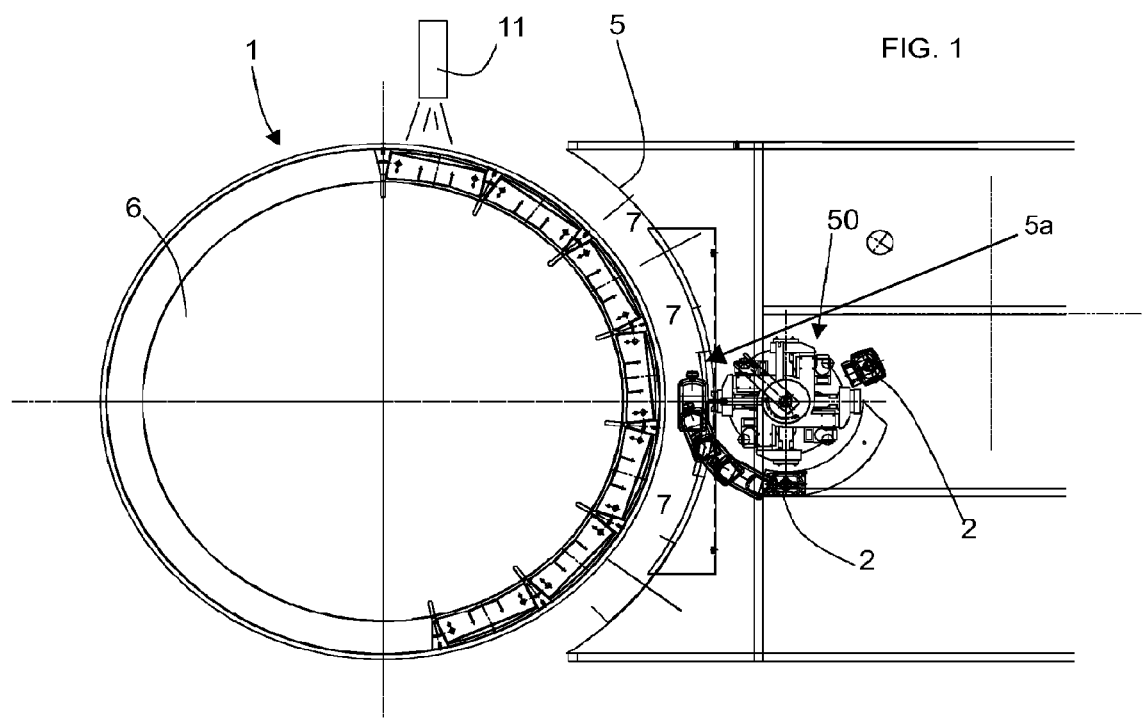
Figure 3:
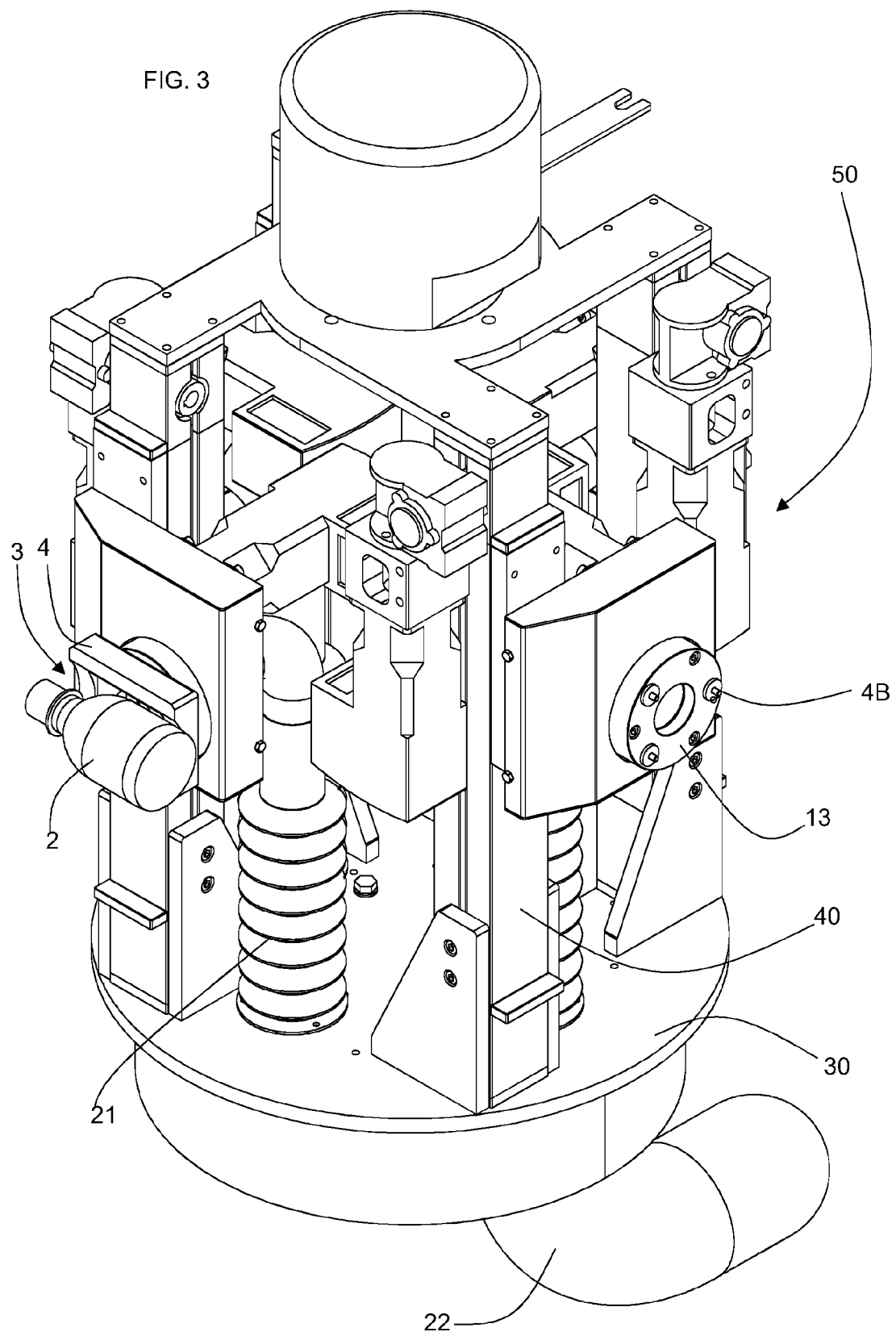
Figure 4:
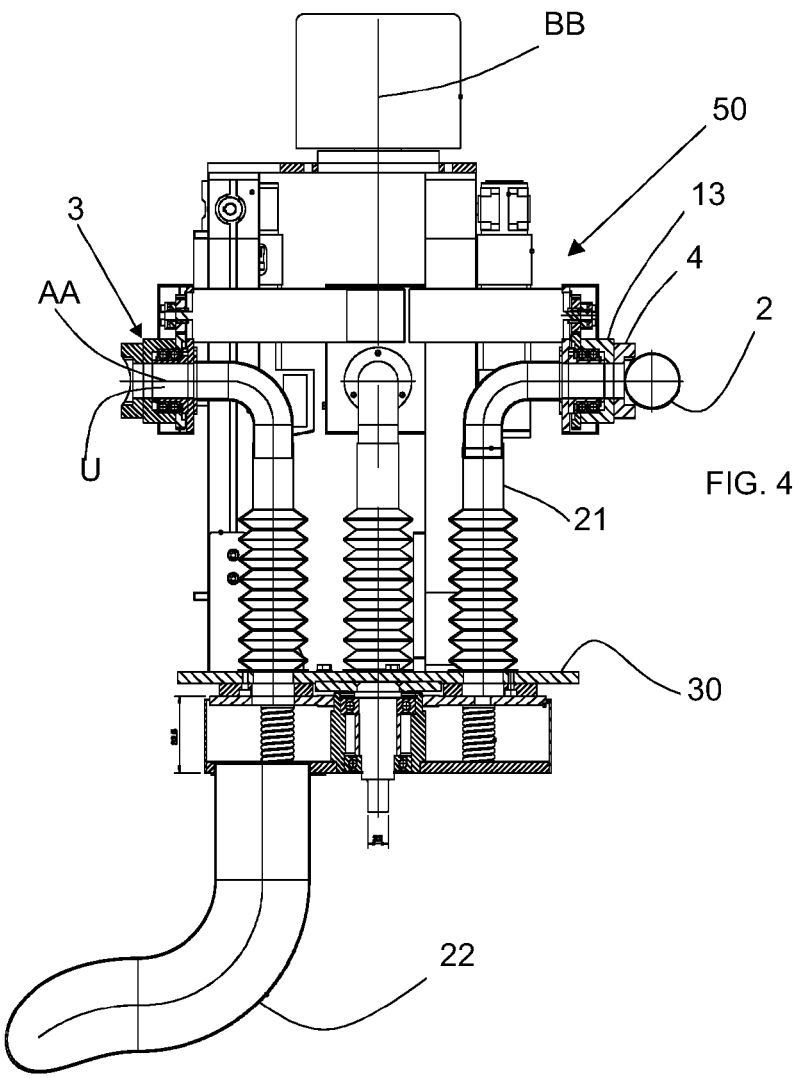
Figure 5:
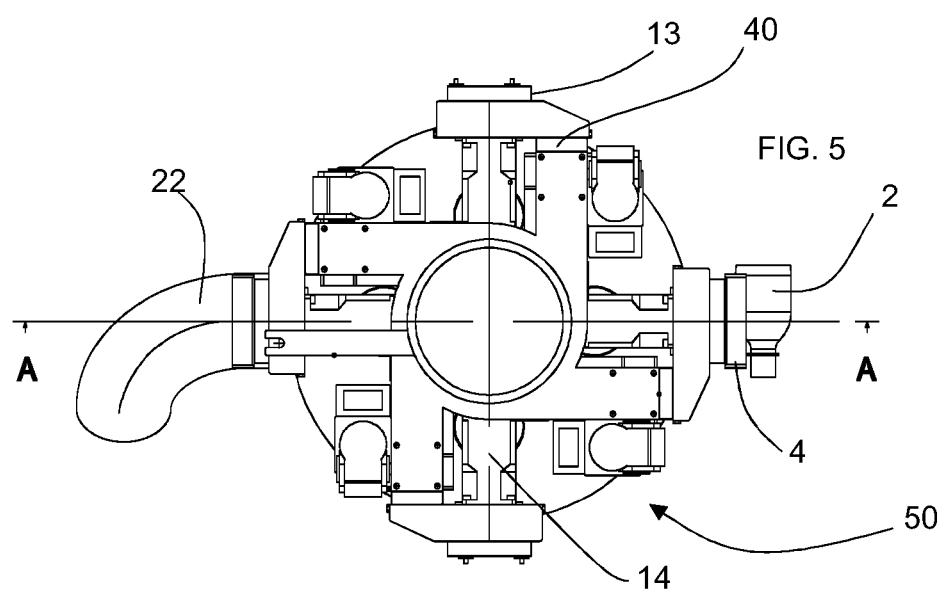
Figure 6:
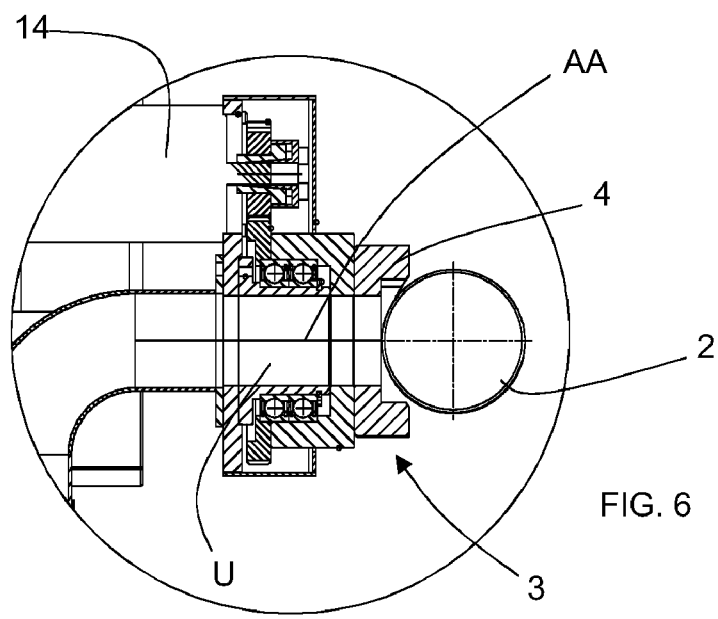
Figure 7:
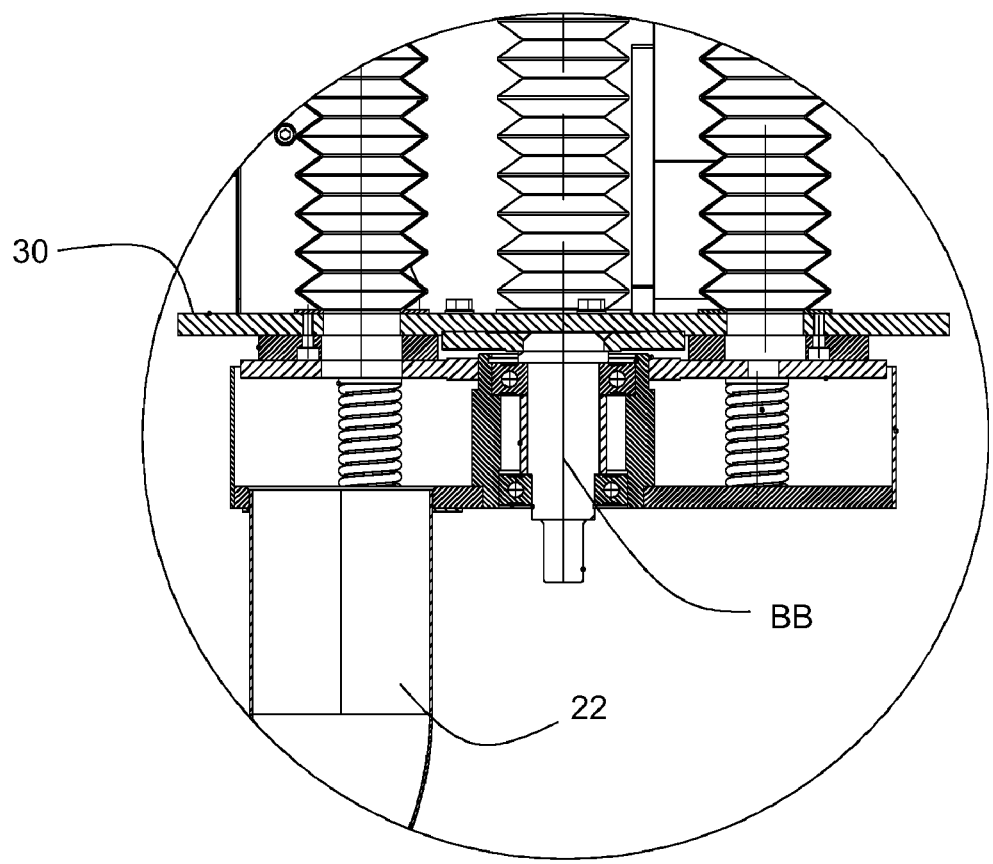

This and other features will be more apparent from the following description of a few embodiments, which are shown by way of example and without limitation in the accompanying drawings, in which:

FIG. 1 shows an apparatus for unscrambling and aligning bulk plastic bottles, containers, cans or performs of the present invention, FIG. 2 is an elevational view of the assembly of FIG. 2, FIG. 3 is a perspective view of the container pull-out turret, FIG. 4 is an elevational view of the container pull-out turret, FIG. 5 is a plan view of the container pull-out turret, FIG. 6 shows a detail of the container pick-up hand/unit, FIG. 7 shows a detail of the lower part of the pull-out turret.

DESCRIPTION OF THE PREFERRED EMBODIMENTS

Referring to FIGS. 1 and 2, numeral 1 generally designates an apparatus for unscrambling and aligning bulk containers 2, which comprises a substantially circular hopper 6 for collecting containers 2; a plurality of cradling pockets 7 for containers 2, arranged in such a manner as to form a circular ring 7a, external to and concentric with the hopper. The hopper 6 may have a flat or conical bottom.

The cradling pockets 7 are in turn delimited by an outer wall 5, concentric with the cradling pockets 7.

At least one aperture 5a is formed along the outer wall 5, which allows a pull-out turret 50 to pull out the container 2 from the cradling pocket 7 when it faces the aperture 5a.

Particularly referring to FIGS. 3, 4, 5, 6 and 7, the pull-out turret 50 is shown to comprise a plurality of pick-up means 3 as described below.

Multiple turrets 50 may be also located along the periphery of the wall 5 and at each aperture 5a.

The bottle to be unscrambled might have a non-horizontal orientation in its pocket 5, and may be inclined, depending on its geometry: one or more visual-optical checking devices 11 monitor the orientation of the container 2 and arrange and orient the pick-up hand 3, before it reaches the corresponding pocket 5, for the container to be picked up in an optimized manner. As a result, the present apparatus affords arbitrary rotation of the pick-up hand.

The pick-up means 3 may be of mechanical or pneumatic type, depending on the type of containers to be pulled out.

In the illustrated embodiment, relating to a pneumatic pick-up unit 3, each unit mounted to the turret 50 (rotating on the platform 30) includes a manifold 21 adapted to connect air under negative pressure from the fan (not shown), via the conduit 22, to the pick-up outlet U, where a template 4 is provided against which the container 2 is held.

The template 4 is removable, which allows it to be changed according to the type and/or shape of the container to be pulled out: special centering means 4B, preferably equipped with magnets, allow quick replacement of the template 4 on the spindle 13 that rotates about the horizontal axis AA, to allow rotation of the template and its respective container.

Rotation of the spindle 13 is ensured by a gearset which is in turn driven by a corresponding motor 14 that can control its rotation angle as desired.

Namely, the motor 14 is a permanent-magnet brushless DC motor.

Thus each unit 3 is composed of the manifold 21, the spindle 13, the motor 14 and the template 4; the unit so formed rotates on the platform 30 of the turret 50, namely about its axis of rotation BB.

Hence the template 4 is moved to a position that faces the aperture 5A of the unscrambling apparatus and can attract the container 2 without contacting it, due to the action of the fan connected thereto as described above.

The possibility of not contacting the bottle/container allows any tolerances to be accounted for.

Each unit 3 as described above is slideably mounted to a linear guide 40, allowing height adjustment, for changing both the pick-up position, according to the type of container 2, and the release position outside the apparatus 1.

It shall be noted that the means for reading the container position in the cradling pocket of the unscrambling apparatus 1 can ascertain such position prior to its arrival at the aperture 5A, so that the proper pick-up position may be preventively transmitted to the corresponding pick-up means 3.

The adjustment feature may obviously relate to both rotation (axis AA) and height (axis BB), due to the provision of the linear guide 40.

A phaser device is also provided for advancing and/or delaying the turret 50 relative to the apparatus 1 to obviate format change problems.

In a variant embodiment, the template 4 has the air outlet/inlet U (for picking up the container 2) eccentric to the axis of rotation AA; to define different pick-up positions, in which it can reach the container or preform to be picked up, and avoid unreachable pick-up positions.

The invention claimed is:

1. An apparatus (1) for unscrambling and aligning bulk plastic containers (2), comprising:
   a substantially circular hopper (6) to collect the containers (2) the hopper comprising an outer wall (5) and a bottom;
   a plurality of pockets (7) to cradle the containers (2), the pockets arranged in a circular ring (7a) inside and concentric with the hopper (6) between the bottom and the outer wall (5);
   an aperture (5a) formed in the outer wall (5);
   a checking device (11) to monitor an orientation of each container (2);
   a rotary pull-out turret (50);
   linear guides (40) mounted on the rotary pull-out turret (50);
   a plurality of pick-up units (3) arranged to pick up the containers (2),
   the pick-up units (3) mounted to the pull-out turret (50), each said pick-up unit (3) adapted to pull out the container (2) from the pocket (7) at the corresponding aperture (5a) and rotate the container neck up, said pull-out action being substantially radial to the position of the container (2) in the ring (7a) of pockets (7),
   wherein each pick-up unit (3) comprises a rotation adjusting unit (14) provided to adjust rotation in a first horizontal axis (AA), each pick-up unit (3) slideably mounted to one of said linear guides (40) to allow a height adjustment of the pick-up unit (3) in a second axis (BB), to change both the pick-up position and the release location according to the type of container (2), and
   wherein the checking device (11) to monitor the orientation of the container (2) in the cradling pocket ascertains the orientation prior to the container's arrival at the aperture (5A), and preventively transmits the proper orientation of the pick-up unit (3) to said pick-up unit (3), by adjusting the rotation in first horizontal axis AA and the height in second axis BB.

2. An apparatus (1) for unscrambling and aligning bulk plastic containers (2), said apparatus comprising:
   a substantially circular hopper (6) adapted to collect containers (2);
   a plurality of cradling pockets (7) to cradle the containers (2), the cradling pockets (7) forming a circular ring (7a) internal to and concentric with the hopper (6);
   an outer wall (5) delimiting the cradling pockets (7) and concentric with the cradling pockets (7);
   an aperture (5a) in the outer wall (5);
   a rotating platform (30);
   a pull-out turret (50) mounted on the platform (30) and positioned adjacent the aperture (5a);
   linear guides (40) mounted on the rotary pull-out turret (50);
   a plurality of pick-up units (3) mounted to the pull-out turret (5) and arranged to pull out the containers (2) from the cradling pockets (7) when each container faces the aperture (5a); each said pick-up unit (3) adapted to pull out each container (2) from the pocket (7) at the corresponding aperture (5a) and rotate the container (2) neck up, said pull-out action being substantially radial to the position of the container (2) in the ring (7a) of pockets (7);
   each pick-up unit (3) comprising a rotation adjusting unit (14) to adjust rotation in a horizontal first axis (AA);
   each pick-up unit (3) slideably mounted to a respective one of the linear guides (40) to allow a height adjustment for changing both a container pick-up position and a container release position, each linear guide (40) allowing the height adjustment of the corresponding pick-up unit (3) in a vertical second axis (BB) to respectively change both a container pick-up position and a container release location according to container type (2); and
   a checking device (11) arranged to monitor an orientation of each container (2), wherein, based on the monitored orientation, the checking device (11) is operative to arrange and orient a corresponding one of the pick-up units (3), via the corresponding rotation adjusting unit (14) and the corresponding linear guide (40) and before the corresponding pick-up unit reaches each container (2), to pick up the container in an optimized manner for the monitored orientation.

* * * * *